(12) United States Patent
Zhang et al.

(10) Patent No.: US 10,347,990 B2
(45) Date of Patent: Jul. 9, 2019

(54) LOW-PROFILE DUAL-BAND FILTERING PATCH ANTENNA

(71) Applicant: South China University of Technology, Guangzhou, Guangdong (CN)

(72) Inventors: Xiu Yin Zhang, Guangdong (CN); Yao Zhang, Guangdong (CN); Yong-Mei Pan, Guangdong (CN); Wen Duan, Guangdong (CN)

(73) Assignee: South China University of Technology, Guangzhou (CN)

( * ) Notice: Subject to any disclaimer, the term of this patent is extended or adjusted under 35 U.S.C. 154(b) by 199 days.

(21) Appl. No.: 15/602,116

(22) Filed: May 23, 2017

(65) Prior Publication Data

US 2018/0151955 A1 May 31, 2018

(30) Foreign Application Priority Data

Nov. 25, 2016 (CN) .......................... 2016 1 1051345

(51) Int. Cl.
| | |
|---|---|
| *H01Q 1/24* | (2006.01) |
| *H01Q 9/04* | (2006.01) |
| *H01Q 5/30* | (2015.01) |
| *H01Q 1/38* | (2006.01) |
| *H01Q 9/28* | (2006.01) |
| *H04B 7/0413* | (2017.01) |
| *H01Q 1/52* | (2006.01) |
| *H01Q 19/00* | (2006.01) |
| *H01Q 5/371* | (2015.01) |

(52) U.S. Cl.
CPC ............ *H01Q 9/045* (2013.01); *H01Q 1/243* (2013.01); *H01Q 1/38* (2013.01); *H01Q 1/521* (2013.01); *H01Q 5/30* (2015.01); *H01Q 5/371* (2015.01); *H01Q 9/0414* (2013.01); *H01Q 9/0457* (2013.01); *H01Q 9/28* (2013.01); *H01Q 19/005* (2013.01); *H04B 7/0413* (2013.01)

(58) Field of Classification Search
CPC   H01Q 1/38; H01Q 9/045; H01Q 5/30; H01Q 1/243; H01Q 1/52
USPC .................................................. 343/700 MS
See application file for complete search history.

(56) References Cited

U.S. PATENT DOCUMENTS

| | | | | |
|---|---|---|---|---|
| 6,133,879 A * | 10/2000 | Grangeat | ................. | H01Q 1/24 343/700 MS |
| 6,727,854 B2 * | 4/2004 | Fang | ..................... | H01Q 1/243 343/700 MS |
| 7,876,279 B2 * | 1/2011 | Ma | ......................... | H01Q 1/243 343/767 |
| 9,761,951 B2 * | 9/2017 | Kuonanoja | ............ | H01Q 9/145 |
| 2011/0140977 A1 * | 6/2011 | Yang | .................... | H01Q 1/2216 343/725 |
| 2017/0170553 A1 * | 6/2017 | Maas | .................. | H01Q 9/0407 |

* cited by examiner

*Primary Examiner* — Huedung X Mancuso

(57) ABSTRACT

A low-profile dual-band filtering patch antenna and its application to LTE MIMO system are disclosed. By using two embedded U-shaped radiating patches and a multi-stub microstrip feed-line, two operating bands and four radiation nulls can been generated and individually controlled, the design is thus very simple and flexible. Based on the proposed low-profile dual-band filtering patch antenna, a MIMO antenna with a very low profile, low mutual coupling and low ECCs has been presented.

18 Claims, 11 Drawing Sheets

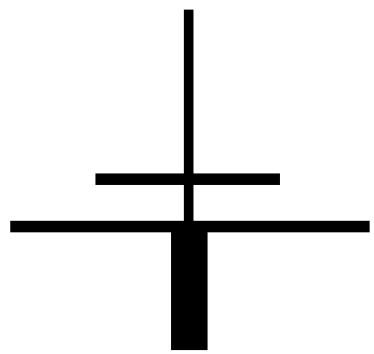
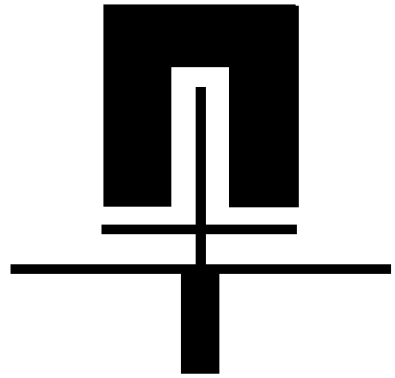
Fig.2A            Fig.2B
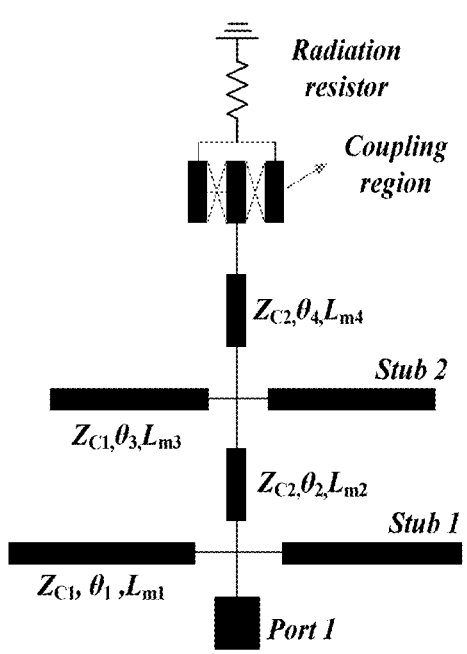
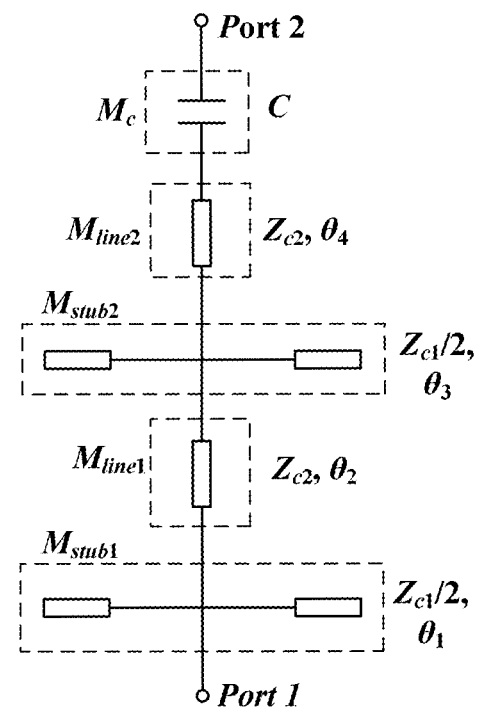
Fig.3A            Fig.3B

LOW-PROFILE DUAL-BAND FILTERING PATCH ANTENNA

CROSS REFERENCE TO RELATED APPLICATIONS

The present application claims the benefit of Chinese Patent Application No. 201611051345.5 filed on Nov. 25, 2016. All the above are hereby incorporated by reference.

TECHNICAL FIELD

The present disclosure relates generally to a patch antenna, and more particularly, to a low-profile dual-band filtering patch antenna and its application to LTE MIMO system.

BACKGROUND

With the increasing demand of various communication services, wireless customer premise equipments (CPEs) are necessary in the heterogeneous environment of Long Term Evolution (LTE) networks. The LTE CPEs are used for broadband data access and data service conversion between Wi-Fi, wired LANs and LTE [1]. The data are transmitted through CPEs to the LTE networks. To provide high-speed data transmission and better coverage, multiple-input multiple-output (MIMO) antennas are usually adopted in wireless CPEs. Also, the technique of carrier aggregation (CA) is employed in LTE-Advanced to aggregate fragmented spectrum from different bands into a larger spectrum resource for further enhancing the data transmission capacity. As a result, multiple sets of antennas and bandpass filters operating at various frequencies are involved in the RF front-ends of CPEs. On the other hand, the CPEs are often required to be low profile and as compact as possible for easy installation. Therefore, it is of great interest to integrate the antenna and bandpass filter to increase the integration level of RF front-ends.

In recent years, some integrated designs of filters and antennas were proposed. A typical method to design filtering antennas is to replace the last stage of filter network with an antenna radiator, which results in high integration. However, in some designs, extra filtering circuits are inserted to the antenna feeding networks, causing extra insertion loss and degrading antenna gains. To solve this problem, filtering antennas without extra filtering circuits are proposed in [14]-[15] and the in-band gains are not affected. However, the reported filtering antennas above are restricted to single-band operation, and they are difficult to fulfill the required dual-band specifications of CA.

Recently, some dual-band filtering antennas were reported. In some technical solutions, a dual-band antenna and filter are designed separately and then cascaded together to form a dual-band antenna-filter module. For example, two dual-band planar filtering antennas were proposed. The rectangular patch generates two orthogonal polarizations at the two bands in one example. And the TM10 and TM30 modes of the patch were employed to enable dual-band operation in another example. However, the operating frequencies of these two antennas cannot be controlled individually. Besides, the peek gains of them within the two bands are only −1.8/−4.0 dBi and 1.1/3.8 dBi due to the extra insertion loss caused by the feeding network. In a further example, a U-slot patch antenna is integrated with a dual-mode stub-loaded resonator through electromagnetic coupling. Good performance including harmonic suppression is obtained. However, it employs a 2-layer PCB structure and cannot meet the low-profile requirement. Furthermore, there are no specific out-of-band radiation nulls to improve skirt selectivity.

Therefore, a heretofore unaddressed need exists in the art to address the aforementioned deficiencies and inadequacies.

SUMMARY

In one aspect, the present invention relates to a low-profile dual-band filtering patch antenna comprising a substrate, a ground on a bottom layer of the substrate, and a first U-shaped patch operating at upper frequency bands, a second U-shaped patch operating at lower frequency bands and a multi-stub microstrip line, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure.

In one embodiment, the first U-shaped patch and the second U-shaped patch are arranged symmetrically relative to a central axis.

In one embodiment, the multi-stub microstrip line is arranged on a top layer of the substrate and comprises a main transmission line inserted into an opening of the first U-shaped patch, a first pair of open-ended stubs and a second pair of open-ended stubs loaded at both sides close to openings of the first U-shaped patch and the second U-shaped patch.

In one embodiment, the main transmission line is loaded along the central axis, the first pair of open-ended stubs and the second pair of open-ended stubs are loaded symmetrically on both sides of the main transmission line.

In one embodiment, the first pair of open-ended stubs having a shorter length and the second pair of open-ended stubs having a longer length are parallel to each other, the main transmission line crosses the first pair of open-ended stubs and reaches the second pair of open-ended stubs.

In one embodiment, a length of the first pair of open-ended stubs is shorter than a length of the first U-shaped patch, and a length of the second pair of open-ended stubs is longer than the length of the first U-shaped patch but shorter than a length of the second U-shaped patch.

In one embodiment, the low-profile dual-band filtering patch antenna further comprises an input port connecting to the main transmission line.

In another aspect, the present invention relates to a low-profile dual-band filtering patch antenna comprising a substrate, a ground on a bottom layer of the substrate, and a first U-shaped patch operating at upper frequency bands, a second U-shaped patch operating at lower frequency bands and a multi-stub microstrip line on a top layer of the substrate, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure; wherein the second U-shaped patch and the multi-stub microstrip line are arranged symmetrically relative to a central axis; wherein the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch; wherein the main transmission line is loaded along the central axis, the first pair of open-ended stubs and the second pair of open-ended stubs are loaded symmetrically on both sides of the main transmission line, the first pair of open-ended stubs having a shorter length and the second pair of open-ended stubs having a longer length are parallel to each other, the main transmission line crosses the first pair of open-ended stubs and reaches the second pair of open-ended stubs.

In one embodiment, a length of the first pair of open-ended stubs is shorter than a length of the first U-shaped patch, and a length of the second pair of open-ended stubs is longer than the length of the first U-shaped patch but shorter than a length of the second U-shaped patch, and an input port connecting to the main transmission line.

In a further aspect, the present invention relates to a LET MIMO system, comprising a substrate, a ground on a bottom layer of the substrate, and at least one low-profile dual-band filtering patch antenna unit arranged on the substrate, wherein the low-profile dual-band filtering patch antenna unit comprises a first U-shaped patch operating at upper frequency bands, a second U-shaped patch operating at lower frequency bands and a multi-stub microstrip line on a top layer of the substrate, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure.

In one embodiment, the LET MIMO system further comprises at least two low-profile dual-band filtering patch antenna units arranged at two sides of a substrate central axis of one substrate.

In one embodiment, the LET MIMO system further comprises at least four low-profile dual-band filtering patch antenna units arranged at four angles of one rectangular substrate.

In one embodiment, each two low-profile dual-band filtering patch antenna units are arranged parallelly and close to each other, and isolated by a decoupling network.

In one embodiment, the decoupling network comprising at least three interdigital short-ended lines with a length of about a quarter-wavelength at the lower frequency bands.

In one embodiment, the first U-shaped patch and the second U-shaped patch are arranged symmetrically relative to a central axis.

In one embodiment, the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch.

In one embodiment, the main transmission line is loaded along the central axis, the first pair of open-ended stubs and the second pair of open-ended stubs are loaded symmetrically on both sides of the main transmission line.

In one embodiment, the first pair of open-ended stubs having a shorter length and the second pair of open-ended stubs having a longer length are parallel to each other, the main transmission line crosses the first pair of open-ended stubs and reaches the second pair of open-ended stubs.

In one embodiment, a length of the first pair of open-ended stubs is shorter than a length of the first U-shaped patch, and a length of the second pair of open-ended stubs is longer than the length of the first U-shaped patch but shorter than a length of the second U-shaped patch.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIGS. 2A and 2B show diagrams of the feeding structure at the upper and lower frequency bands according to the low-profile dual-band filtering patch antenna in FIG. 1, respectively.

FIGS. 3A and 3B show diagrams of the equivalent circuit and corresponding two-port network according to the low-profile dual-band filtering patch antenna in FIG. 1, respectively.

DETAILED DESCRIPTION OF THE PREFERRED EMBODIMENT

Figure 1A:
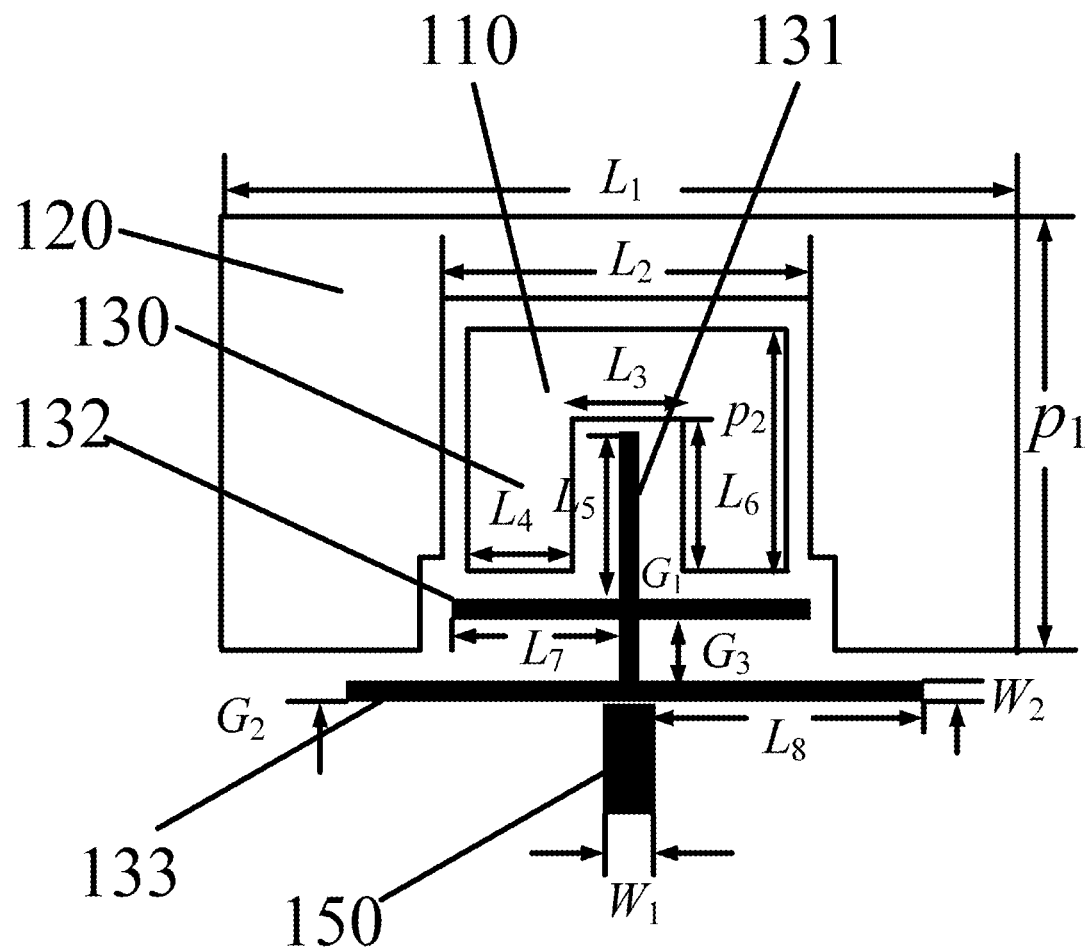
FIGS. 1A and 1B show a top view and a side view of the low-profile dual-band filtering patch antenna according to one embodiment of the present application.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximate" shall generally mean within 10 percent, preferably within 5 percent, and more preferably within 3 percent of a given value or range. Numerical quantities given herein are approximate, meaning that the term "around", "about" or "approximate" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-16B. In accordance with the purposes of this disclosure, as embodied and broadly described herein, this disclosure, in one aspect, relates to a low-profile dual-band filtering patch antenna and its application to LTE MIMO system.

Figure 1B:
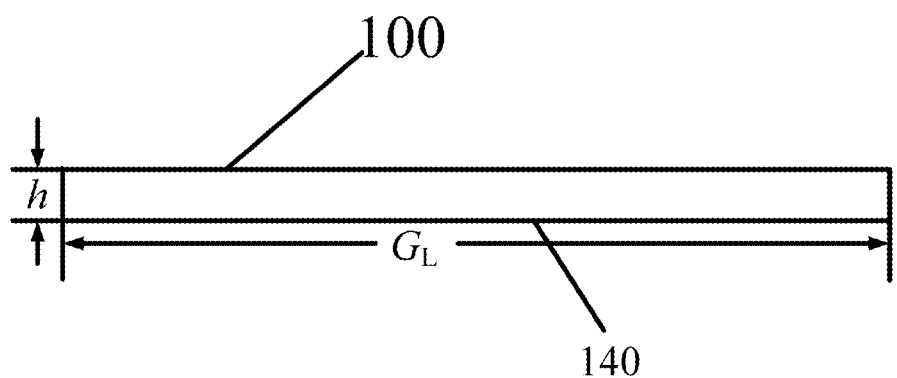

Referring now to FIG. 1, a low-profile dual-band filtering patch antenna is shown according to one embodiment of the present invention. As shown in FIG. 1, the patch antenna low-profile dual-band filtering patch antenna includes a substrate 100, a ground 140 on a bottom layer of the substrate 100, and a low-profile dual-band filtering patch antenna unit arranged on the substrate 100. The low-profile dual-band filtering patch antenna unit comprises a first U-shaped patch 110 operating at upper frequency bands, a second U-shaped patch 120 operating at lower frequency bands and a multi-stub microstrip line 130, which are all arranged on a top layer of the substrate. As shown in FIG. 1, the first U-shaped patch 110 having a smaller size is embedded in the second U-shaped patch 120 having a larger size for size reduction. The first U-shaped patch 110 and the second U-shaped patch 120 are arranged symmetrically relative to a central axis. In a preferable embodiment, the substrate 100 has a relative permittivity of 2.2 and a thickness of 1.575 mm.

Further referring FIG. 1, the multi-stub microstrip line 130 comprises a main transmission line 131 inserted into an opening of the first U-shaped patch 110, a first pair of open-ended stubs 132 and a second pair of open-ended stubs 133 loaded at both sides close to openings of the first U-shaped patch 110 and the second U-shaped patch 120. In a preferable embodiment, the main transmission line 131 is loaded along the central axis, the first pair of open-ended stubs 132 and the second pair of open-ended stubs 133 are loaded symmetrically on both sides of the main transmission line 131.

In a preferable embodiment, the first pair of open-ended stubs 132 having a shorter length and the second pair of open-ended stubs 133 having a longer length are parallel to each other, and the main transmission line 131 crosses the first pair of open-ended stubs 132 and reaches the second pair of open-ended stubs 133. Furthermore, the length of the first pair of open-ended stubs 132 is shorter than a length of the first U-shaped patch 110, and a length of the second pair of open-ended stubs 133 is longer than the length of the first U-shaped patch 110 but shorter than a length of the second U-shaped patch 120.

In one further embodiment, the low-profile dual-band filtering patch antenna further comprises an input port 150 connecting to the main transmission line 131.

FIGS. 2A and 2B show diagrams of the feeding structure at the upper and lower frequency bands according to the low-profile dual-band filtering patch antenna in FIG. 1, respectively.

As observed in FIG. 2A, the multi-stub microstrip line 130 is employed as a feeding structure to feed the first U-shaped patch 110 having a smaller size that operating at the upper frequency bands. As observed in FIG. 2B, for the lower frequency band, the first U-shaped patch 110 having a smaller size does not radiate but acts as a part of the feed structure together with the multi-stub microstrip line 130 to excite the second U-shaped patch 120 having a larger size.

With such a compact configuration as shown in FIG. 1, the low-profile dual-band filtering patch antenna according to the present application can generate a dual-band elliptic bandpass response in the boresight gain. The operating principle is studied based on filter theory. The schematic of the proposed antenna is similar to that of a filter, with the corresponding circuit shown in FIG. 3A. It consists of a multi-stub feed network and a radiation resistor which represents the first and second U-shaped patches. The multi-stub feed network is composed of a main transmission line with length of $L_{m2}+L_{m4}$, and two pairs of open-ended stubs denoted as Stub 1 and Stub 2 which are loaded symmetrically on both sides of the main transmission line. The input port (Port 1) is connected to the main transmission line. In order to explore the transmission characteristics of signal in the network, Port 2 is used to take place of the radiation resistor, as shown in FIG. 3B. Herein, a capacitor C is used to represent the coupling between feeding circuits and radiating patches.

To investigate the transmission characteristics of the above two-port network, the ABCD matrices of each part (stub 1, line 1, stub 2, line 2 and capacitor C) in FIG. 3B are given as follows:

$$M_{stub1} = \begin{bmatrix} 1 & 0 \\ \dfrac{2j}{Z_{c1}\cot\theta_1} & 1 \end{bmatrix} \quad (1)$$

-continued $$M_{line1} = \begin{bmatrix} \cos\theta_2 & jZ_{c2}\sin\theta_2 \\ \dfrac{j\sin\theta_2}{Z_{c2}} & \cos\theta_2 \end{bmatrix} \quad (2)$$

$$M_{stub2} = \begin{bmatrix} 1 & 0 \\ \dfrac{2j}{Z_{c1}\cot\theta_3} & 1 \end{bmatrix} \quad (3)$$

$$M_{line2} = \begin{bmatrix} \cos\theta_4 & jZ_{c2}\sin\theta_4 \\ \dfrac{j\sin\theta_4}{Z_{c2}} & \cos\theta_4 \end{bmatrix} \quad (4)$$

$$M_c = \begin{bmatrix} 1 & \dfrac{1}{j\omega c} \\ 0 & 1 \end{bmatrix} \quad (5)$$

Thus, the ABCD matrices M of the whole circuit can be obtained by multiplying their individual counterparts.

$$M = M_{stub1} \times M_{line1} \times M_{stub2} \times M_{line2} \times M_c = \begin{bmatrix} A & B \\ C & D \end{bmatrix} \quad (6)$$

Then, after ABCD- and Y-parameter conversions, the S-parameter of the network can be expressed as below:

$$S_{12} = \dfrac{2}{A + \dfrac{B}{Z_0} + C \times Z_0 + D} = \dfrac{f_1}{f_2} \quad (7)$$

where $Z_0$ denotes the input port impedance, $f_1$ and $f_2$ denote the numerator and denominator of $S_{12}$. Obviously, the transmission zeros of the circuit can be obtained when $S_{12}=0$. With the help of MATLAB compiler, the condition of $S_{12}=0$ can be achieved as equation (8) and simplified as equation (9) or (10).

$$f_1 = 2 \cdot Z_0 \cdot C \cdot \omega \cdot Z_{C1}^2 \cdot Z_{C2} \cdot \cot\theta_1 \cdot \cot\theta_3 = 0, \text{ and } f_2 \neq 0 \quad (8)$$

$$\cot\theta_1 \cdot \cot\theta_3 = 0 \quad (9)$$

$$\theta_1 = \dfrac{\pi}{2} + n\pi \text{ or } \theta_3 = \dfrac{\pi}{2} + n\pi \quad (10)$$

From (8)-(10), it is found that the electrical lengths $L_{m1}$ and $L_{m3}$ are quarter-wavelength at corresponding frequencies of the two zeros. Conversely, the frequencies of the two transmission zeros $f_{z1}$ and $f_{z2}$ can be determined by (11) and (12):

$$f_{z1} = \dfrac{c}{4L_{m1}\sqrt{\varepsilon_{eff}}} \quad (11)$$

$$f_{z2} = \dfrac{c}{4L_{m3}\sqrt{\varepsilon_{eff}}} \quad (12)$$

where c is the speed of light in free space, and $\varepsilon_{eff}$ denotes the effective dielectric constant of the substrate 100.

Figure 4A:
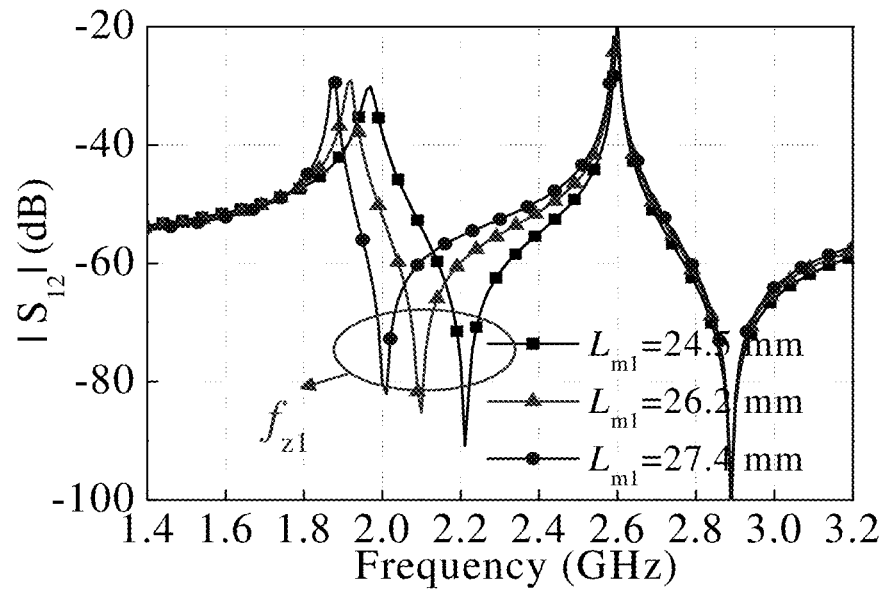
FIGS. 4A and 4B show diagrams of the simulated $|S_{12}|$ of the two-port network in FIG. 3B with different parameters $L_{m1}$ and $L_{m3}$, respectively.
Figure 4B:
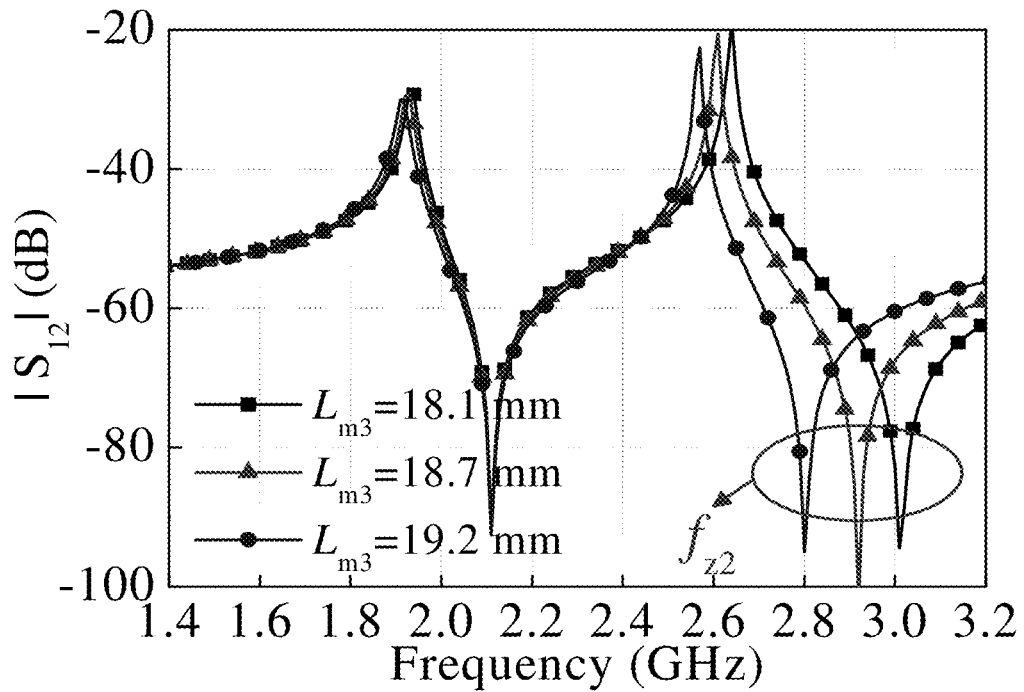

To verify the above results, simulations are carried out by using ADS and IE3D to verify the above results. FIGS. 4A and 4B show diagrams of the Simulated $|S_{12}|$ of the two-port network in FIG. 3B with different parameters $L_{m1}$ and $L_{m3}$, respectively. It's observed that two transmission zeros are generated as expected. When $L_{m1}$ increases from 26 to 28.6 mm, the frequency of the lower transmission zero decreases from 2.2 to 2 GHz whereas the upper transmission zero remains unchanged. Similarly, the frequency of the upper transmission zero can be controlled by tuning the length $L_{m3}$. A comparison between the calculated and simulated frequencies of transmission zeros is tabulated in Table I. Satisfying agreement between them is obtained, verifying the above analysis.

TABLE I

SIMULATED AND CALCULATED FREQUENCIES OF TRANSMISSION ZERO

| $L_{m1}$ (mm) | 27.4 | 26.2 | 24.5 | $L_{m3}$ (mm) | 19.2 | 18.7 | 18.1 |
|---|---|---|---|---|---|---|---|
| Calculated $f_{z1}$ (GHz) | 1.98 | 2.08 | 2.24 | Calculated $f_{z2}$ (GHz) | 2.85 | 2.93 | 3.03 |
| Simulated $f_{z1}$ (GHz) | 2.01 | 2.10 | 2.21 | Simulated $f_{z2}$ (GHz) | 2.80 | 2.92 | 3.01 |

Figure 5:
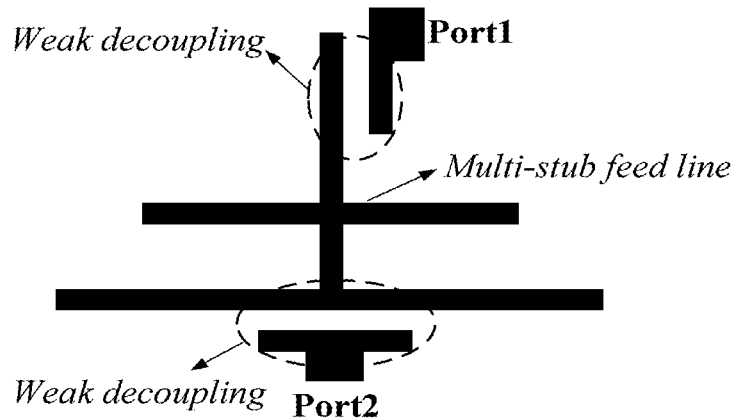
FIG. 5 shows a diagram of the extracted multi-stub feed line of the low-profile dual-band filtering patch antenna in FIG. 1.
Figure 6A:
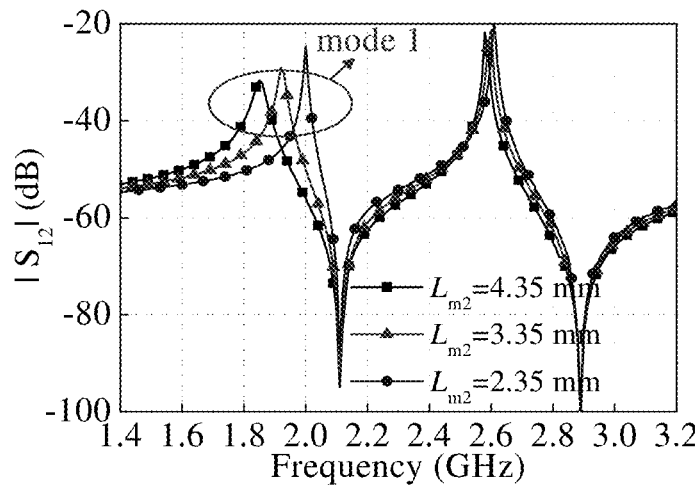
FIGS. 6A and 6B show diagrams of simulated $|S_{12}|$ under week coupling of the two-port network in FIG. 5 with different parameters (a) $L_{m2}$, (b) $L_{m4}$, respectively.
Figure 6B:
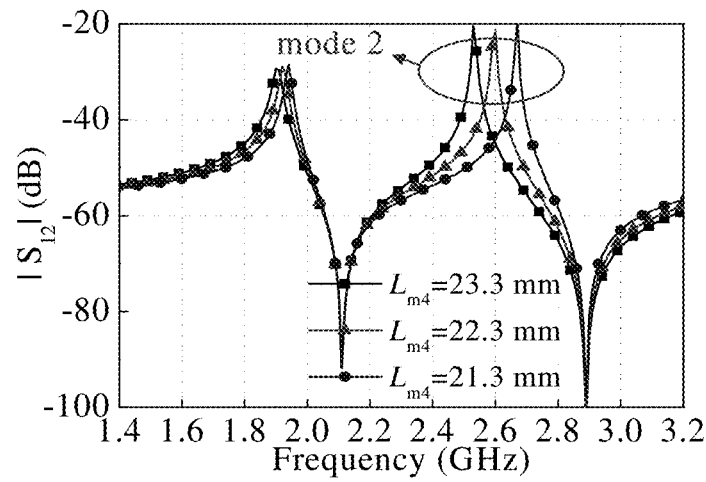
Figure 7:
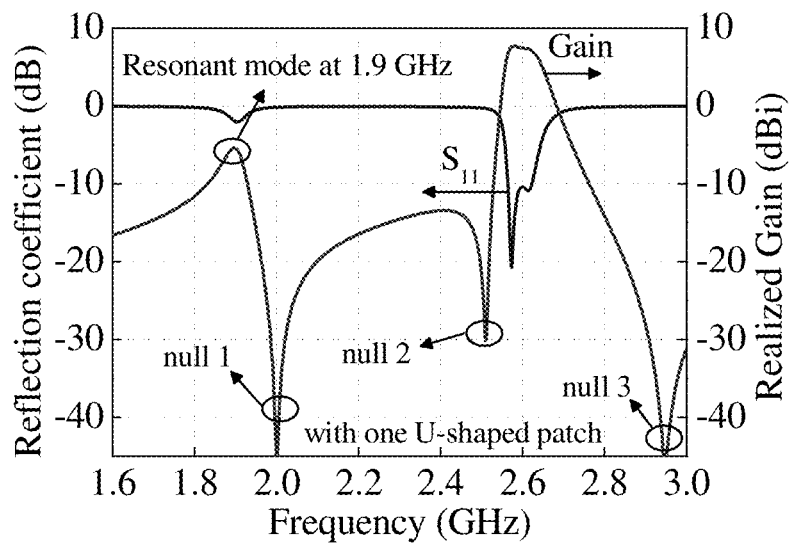
FIG. 7 shows a diagram of reflection coefficient and boresight gain of the antenna without the second U-shaped patch.

With reference to FIGS. 4A and 4B, it is observed that the two-port network can also generate two resonance modes. This is because the multi-stub microstrip line 130 can be regarded as a multi-mode resonator. To investigate the resonant modes of this resonator, two ports are added and weakly coupled to the resonator, as shown in FIG. 5. FIGS. 6A and 6B show diagrams of simulated $|S_{12}|$ under week coupling of the two-port network in FIG. 5 with different parameters (a) $L_{m2}$, (b) $L_{m4}$, respectively. It is seen that the low-frequency resonant mode varies from 1.8 to 2.0 GHz by tuning the length parameter $L_{m2}$, with little effect on the high-frequency resonant mode. Also, the upper mode can be controlled by tuning the length parameter $L_{m4}$. Therefore, by adopting this feed network, two controllable transmission zeros as well as two controllable resonant modes can be obtained.

Based on the above analysis, two controllable transmission zeros can be generated by adopting the multi-stub microstrip feed-line of the present application. Since signals cannot pass through the feed structure to the radiating patches at the specific frequencies of the two transmission zeros, radiation nulls should be thus generated which are very essential to the filtering performance of the antenna.

Figure 8A:
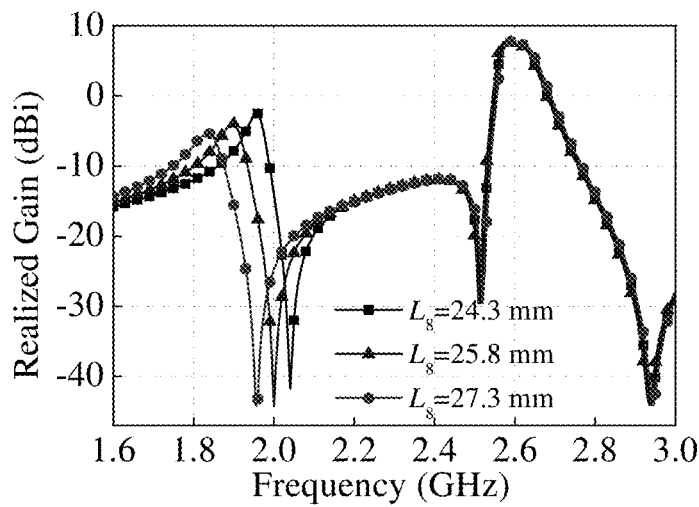
FIGS. 8A, 8B and 8C show diagrams of frequency variation of radiation nulls against design parameters, respectively.
Figure 8B:
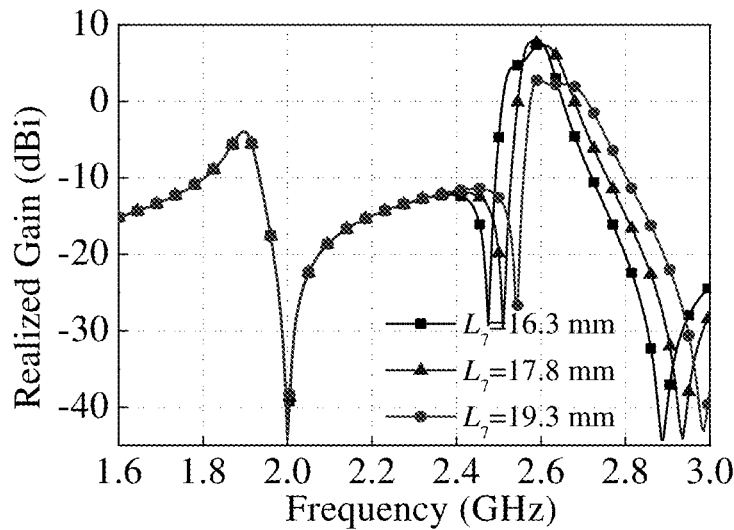
Figure 8C:
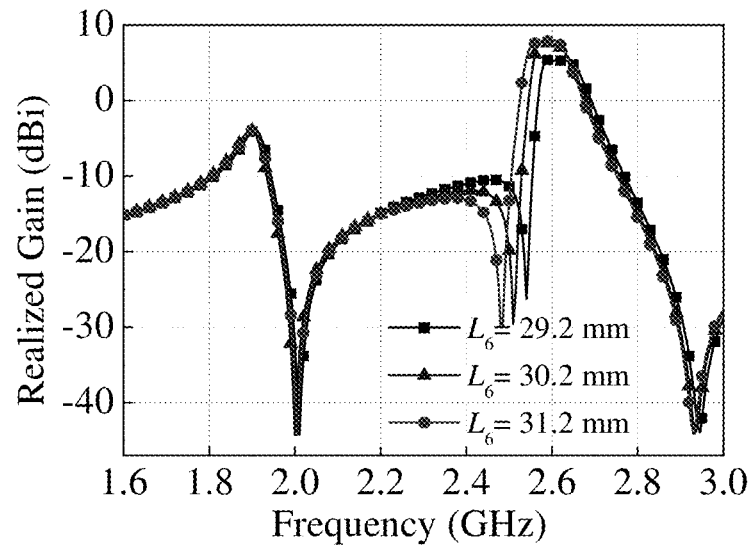

To verify the deduction, a single second U-shaped patch 120 fed with the proposed feeding structure of the present application (referring FIG. 2B) is investigated first. The corresponding simulated results are plotted in FIG. 7. As observed, three radiation nulls in realized gain at the boresight direction are generated at 2.0, 2.55 and 2.97 GHz. It can be seen that at the frequency of null 1, the current on the feed structure terminates at the intersection of the stub 1 and main line. This is because the stub 1 has a quarter-wavelength electric length at this frequency and it is short-circuited at the intersection point. If the length of stub 1 is changed, the frequency of null 1 will shift accordingly, as shown in FIG. 8A. Similar phenomena are observed for the stub 2 at null 3. These results demonstrate that null 1 and null 3 are generated by the two stubs in the feed structure, consistent with the above analysis. As for null 2, strong currents concentrate on the two arms of stub 1 and stub 2 but they flow in opposite direction. The currents on the main transmission line 131 and the edges of the first U-shaped patch 110 are also out-of-phase. Thus, the radiation caused by the out-of-phase currents is cancelled out, resulting in a radiation null at 2.51 GHz. The frequency of null 2 against the length $L_6$ is illustrated in FIG. 8C. It can be seen that the null 2 shifts upward with the decrease of $L_6$. It is noted that the frequency of null 2 is also affected by the length $L_7$ of stub 2, as illustrated in FIG. 8B. This is due to the coupling effect between the patch and stub 2. Generally, the three radiation nulls can be individually controlled and tuned to desired frequencies, which are desirable for enhancing selectivity of the low-profile dual-band filtering patch antenna.

When the larger second U-shaped patch 120 is added in the final dual-band design, an extra radiation null can be generated since the currents on two sides of the slot between the two U-shaped patches are out-of-phase. As a result, there are four radiation nulls within the stopband, greatly enhancing the selectivity and suppression level of the low-profile dual-band filtering patch antenna. This will be demonstrated in the next section.

Figure 9A:
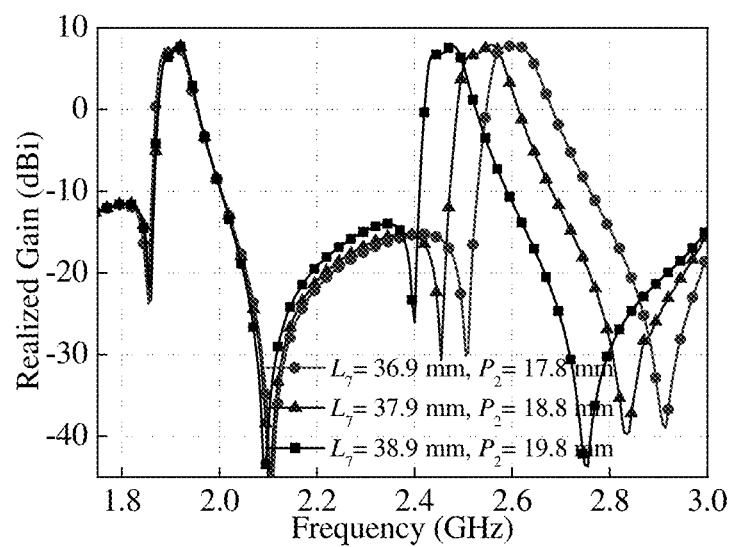
FIGS. 9A and 9B show diagrams of center frequency control of the lower and upper frequency bands, respectively.
Figure 9B:
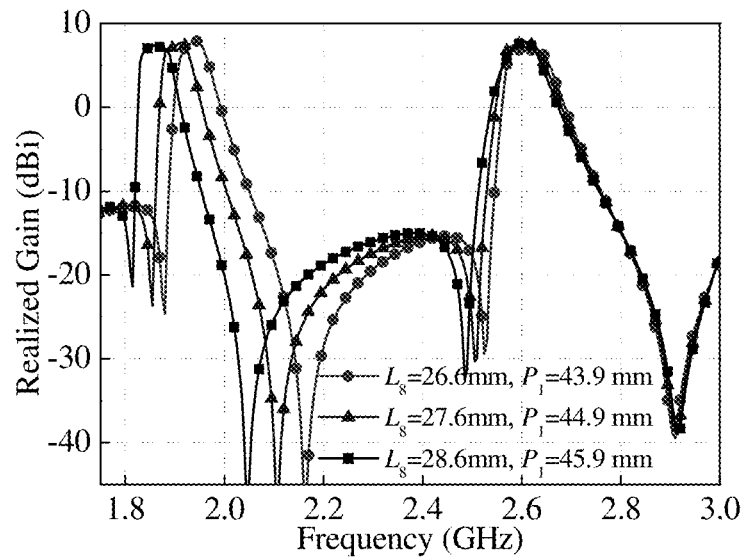

Now, a low-profile dual-band filtering patch antenna a operating at 1.9 GHz and 2.6 GHz for TD-LTE applications (B39- and B38-bands) is designed, with the configuration shown in FIG. 1. As observed, when the antenna operates at the upper frequency band, the smaller first U-shaped patch 110 is excited and the larger second U-shaped patch 120 does not radiate but acts as its loading element. Conversely, when it operates at the lower frequency band, the smaller first U-shaped patch 110 does not radiate but acts as one part of the feed structure to excite the larger second U-shaped patch 120. Since the two U-shaped patches and feed structure can be individually designed, the operating bands can be controlled independently. As illustrated in FIGS. 9A and 9B, the upper frequency band can be independently controlled by tuning the parameters $L_7$ and $P_2$ whereas the lower frequency band can be adjusted by tuning the parameters $L_8$ and $P_1$ with nearly no impact on the upper frequency band. Such features will greatly facilitate the design of the proposed antenna.

The low-profile dual-band filtering patch antenna according to the present application is implemented by embedding the first U-shaped patch having a smaller size into the second U-shaped patch having a larger size, the thickness of the patch antenna is greatly reduced, meanwhile, for the lower frequency band, the first U-shaped patch having a smaller size does not radiate but acts as a part of the feed structure together with the multi-stub microstrip line to excite the second U-shaped patch having a larger size, such that resonance modes can be generated. Furthermore, the two working frequencies can be adjusted separately via controlling the two U-shaped patches and feeding structures. In additional, four radiation nulls can be generated within the stopband, which greatly enhances the selectivity and suppression level of the low-profile dual-band filtering patch antenna.

Based on the above analysis, a design guideline of the low-profile dual-band filtering patch antenna unit operating at LTE B39- and B38-bands is summarized as follows.

1) Firstly, design two U-shaped patches with the resonance modes at 1.9 and 2.6 GHz. Embed the smaller first U-shaped patch in the larger second U-shaped patch and set the initial dimensions of the two patches as $p_1=0.4\sim0.45\lambda_{01}$ and $p_2=0.4\sim0.45\lambda_{02}$ ($\lambda_{0i}$ denotes the wavelength at the center frequency of each operating band in the free space).

2) Secondly, design a multi-stub microstrip line comprising a main transmission line, a first pair of open-ended stubs and a second pair of open-ended stubs as the feed structure. Set the lengths of the first pair of open-ended stubs and the second pair of open-ended stubs as $L_{m1}=0.25\lambda_1$, $L_{m3}=0.25\lambda_2$ ($\lambda_1$ and $\lambda_2$ denote the wavelength in substrate at $f_{z1}$ and $f_{z2}$) to obtain radiation nulls close to the passband edge, and the lengths of the main transmission line are chosen as $L_{m2}+L_{m4}\approx0.25\lambda_3$, $L_{m4}\neq0.25\lambda_4$ ($\lambda_3$ and $\lambda_4$ denote the wavelength in substrate at 1.9 and 2.6 GHz) to obtain two resonant modes near 1.9 and 2.6 GHz for exciting and matching the radiating patches.

3) Finally, refining each parameter to optimize the design for obtaining good filtering performance and required bandwidth. In a preferable embodiment, the low-profile dual-band filtering patch antenna unit is fabricated with the parameters are given in Table II.

TABLE II

PARAMETERS OF THE DUAL-BAND FILTERING ANTENNA

| Length | $L_1$ | $L_2$ | $L_3$ | $L_4$ | $L_5$ | $L_6$ | $L_7$ | $L_8$ | $P_1$ |
|---|---|---|---|---|---|---|---|---|---|
| Value (mm) | 63.4 | 35.6 | 7.6 | 13.7 | 28.9 | 30.2 | 17.8 | 25.8 | 45.0 |

| Length | $P_2$ | $G_1$ | $G_2$ | $G_3$ | $W_1$ | $W_2$ | h | $G_L$ |
|---|---|---|---|---|---|---|---|---|
| Value (mm) | 37.1 | 0.8 | 0.9 | 1.2 | 4.7 | 1.0 | 1.575 | 80 |

Figure 10:
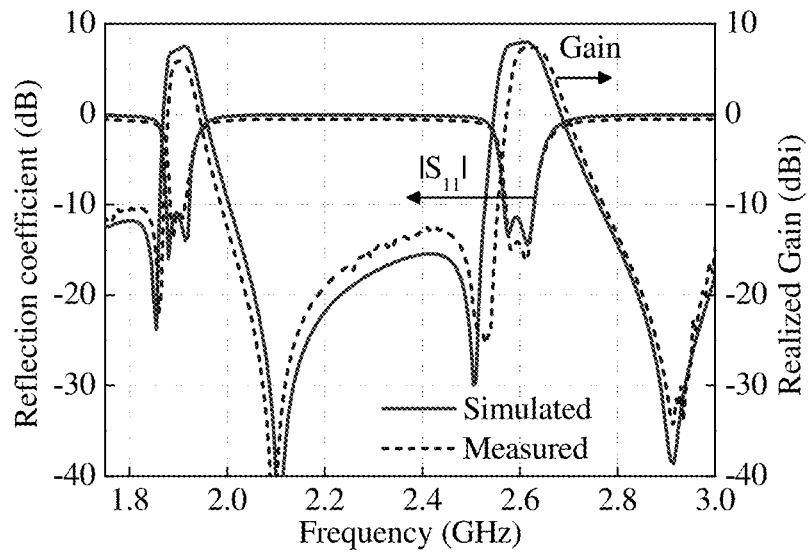
FIG. 10 shows a diagram of simulated and measured results of the low-profile dual-band filtering patch antenna according to one embodiment of the present application.
Figures 11A, 11B:
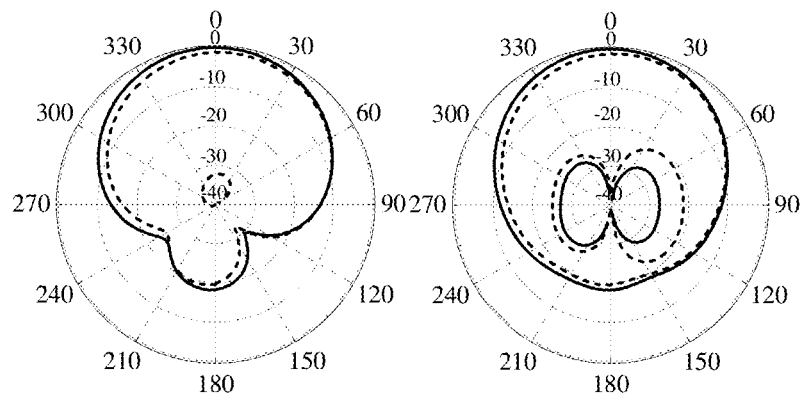
FIG. 11A-11D show diagrams of measured and simulated E-plane and H-plane radiation pattern for the low-profile dual-band filtering patch antenna according to one embodiment of the present application at 1.9 GHz and 2.6 GHz, respectively.
Figures 11C, 11D:
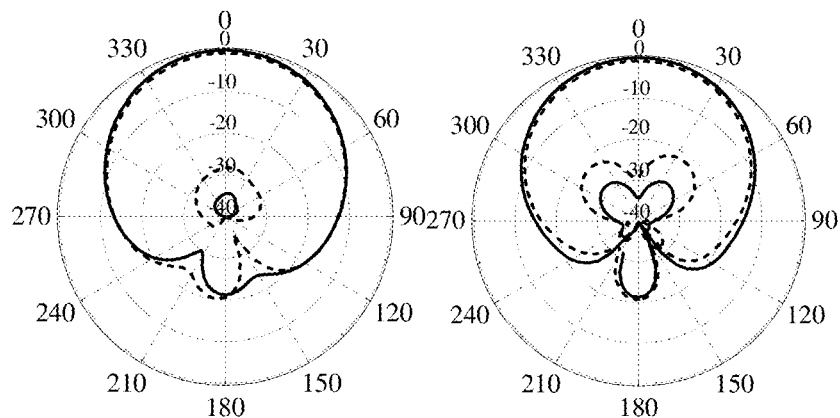

The obtained low-profile dual-band filtering patch antenna unit can be tested for demonstrating the technical effect of the present application. FIG. 10 shows a diagram of simulated and measured results of the low-profile dual-band filtering patch antenna according to one embodiment of the present application. It can be seen that the two operating bands locate at 1.9 and 2.6 GHz for LTE applications. Within the TD-LTE B39-band of 1880-1920 MHz and B38-band of 2570-2620 MHz, the measured reflection coefficient $|S_{11}|$ is less than −10 dB. The simulated gains are 7.6 and 7.8 dBi while the measured gains are about 6.7 and 7.3 dBi for the two bands. The difference between measured and simulated results is mainly due to fabrication tolerance and the losses of SMA connector which was not taken into account in simulation. The out-of-band gains are less than −10 dBi, indicating more than 16 dB out-of-band radiation rejection levels, which can meet the requirement of LTE CPEs. It is also seen that two radiation nulls are generated at the frequencies of 1.85 and 2.10 GHz for the lower band, while two radiation nulls appear at 2.50 and 2.91 GHz for the upper band, resulting in high filtering performance for both the two operating bands.

FIG. 11A-11D show diagrams of measured and simulated E-plane and H-plane radiation pattern for the low-profile dual-band filtering patch antenna according to one embodiment of the present application at 1.9 GHz and 2.6 GHz, respectively. Again, good agreement is observed between them. At 1.9 and 2.6 GHz, the measured co-polarized fields in the E-plane are at least 32 dB and 28 dB stronger than their corresponding cross-polarized counterparts, respectively. For the H-plane, the measured co-polarized fields are 21.2 dB and 22.3 dB stronger than their corresponding cross-polarized counterparts. With reference to the measured front-to-back radios, they are more than 18 dB and 20 dB for the lower and upper bands, respectively.

The proposed low-profile dual-band filtering patch antenna is also compared to the classical design scheme employing a dual-narrow-band filter in cascaded with a wideband antenna. In classical design, the insertion loss of the PCB filter will be as high as 1.5 dB if the bandwidth is narrow. Thus, the gain of the cascaded antenna and filter will be decreased. Although the cavity and dielectric filters feature low insertion loss, they suffer large size and heavy weight, which cannot meet the low-profile requirement of wireless CPEs. In contrast, the proposed antenna obtains quasi-elliptic dual-band responses without using specific filtering circuits and impedance matching networks. Therefore, the configuration is very compact and the insertion loss of feeding circuit is nearly negligible. These characteristics make the proposed low-profile dual-band filtering patch antenna suitable for wireless CPEs.

The low-profile dual-band filtering patch antenna unit provided in the present application can be used in the LET MIMO system, which comprising at least two above mentioned low-profile dual-band filtering patch antenna units. The at least two low-profile dual-band filtering patch antenna units share one substrate. The at least two low-profile dual-band filtering patch antenna units are arranged at two sides of the substrate central axis of one substrate. The substrate central axis is parallel with but not coincident with the central axis of the low-profile dual-band filtering patch antenna unit.

Figure 12:
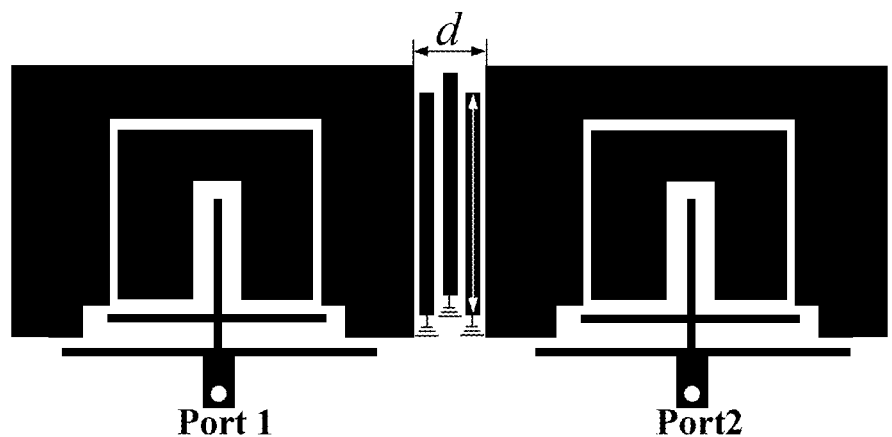
FIG. 12 shows a configuration diagram of a 2-element LET MIMO system according to one embodiment of the present application.
Figure 13:
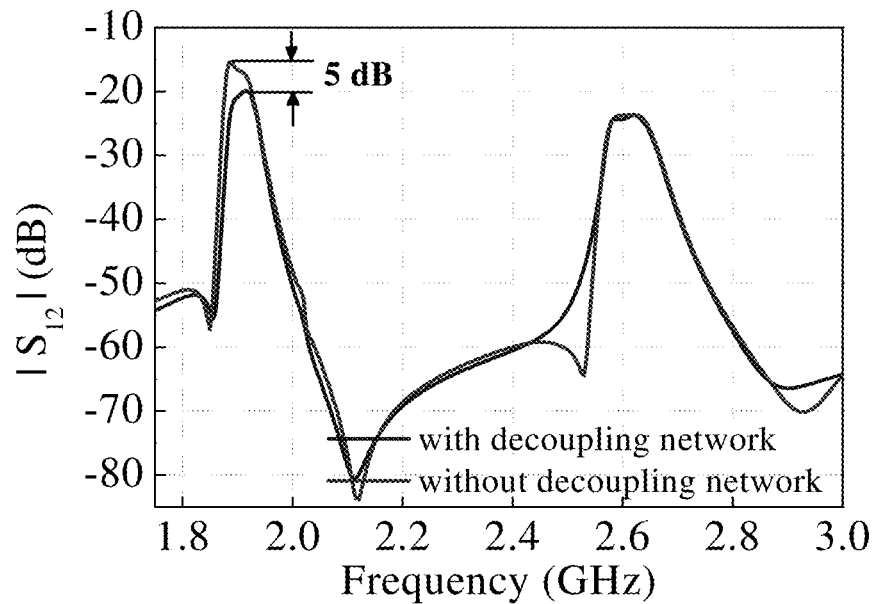
FIG. 13 shows a diagram of simulated $|S_{12}|$ of the 2-element LET MIMO system with and without decoupling network.

FIG. 12 shows a configuration diagram of a 2-element LET MIMO system according to one embodiment of the present application. As shown in FIG. 12, two low-profile dual-band filtering patch antenna units 10 are arranged at two sides of the substrate central axis of one substrate 100. The LET MIMO system in a CPE should be as compact as possible, and therefore the MIMO antenna elements (that is, the low-profile dual-band filtering patch antenna units) need to be placed close to each other. However, when the elements are very close to each other, the mutual coupling between them becomes serious. To solve this problem, a decoupling network 20 is introduced between the two low-profile dual-band filtering patch antenna units, as shown in FIG. 12. In a preferable embodiment, the decoupling network consists of three interdigital short-ended lines 21. Since the larger second U-shaped patches of the two low-profile dual-band filtering patch antenna units are closer to each other (with an edge-to-edge spacing given by d=0.15$\lambda_o$ ($\lambda_o$ is the wavelength in free space at the frequency of lower band)), the mutual coupling between them are stronger than that between the smaller first U-shaped patches. Therefore, the length of the interdigital line 1 is set to be about quarter-wavelength at the lower frequency band to improve the port-to-port isolation. FIG. 13 shows a diagram of simulated |$S_{12}$| of the 2-element LET MIMO system with and without decoupling network. The results are obtained when Port 1 (the left element in FIG. 13) was excited while Port 2 was terminated to a 50Ω load. It can be seen in that with the decoupling network, the current flowing from Port 1 to Port 2 can be dramatically suppressed, which results in lower mutual coupling. With the decoupling network, the |$S_{12}$| in the lower band is improved by 5 dB, and the |$S_{12}$| is less than −20 dB within the whole band.

Figure 14:
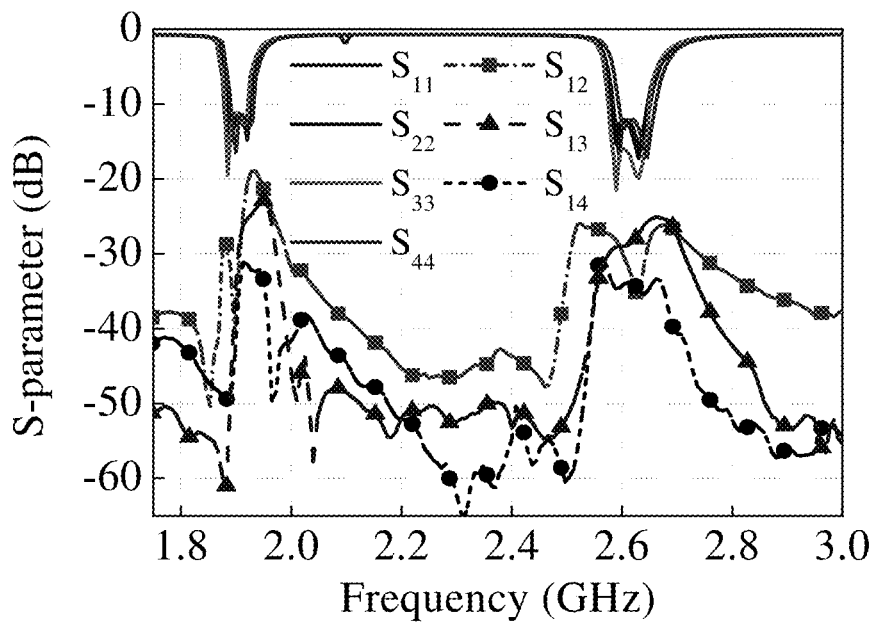
FIG. 14 shows a diagram of measured S-parameters of a 4-element LET MIMO system according to one embodiment of the present application.
Figure 15A:
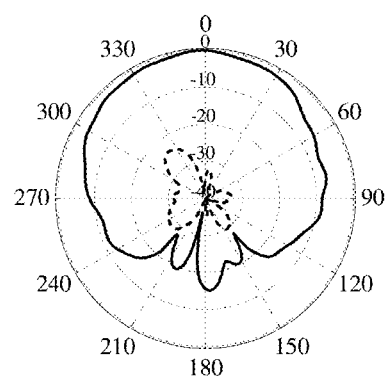
FIG. 15A-15D show measured E-plane and H-plane radiation pattern for element 1 of the 4-element LET MIMO system at 1.9 GHz and 2.6 GHz, respectively.
Figure 15B:
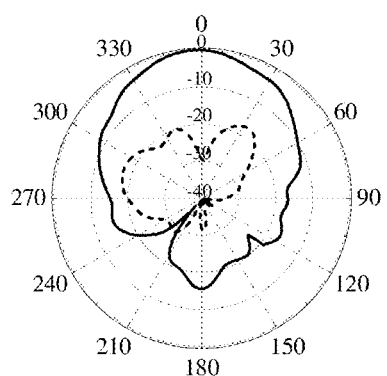
Figure 15C:
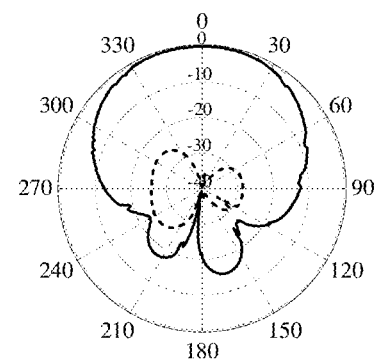
Figure 15D:
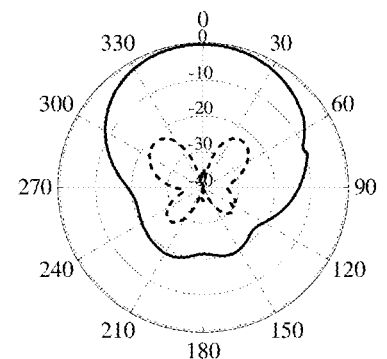
Figure 16A:
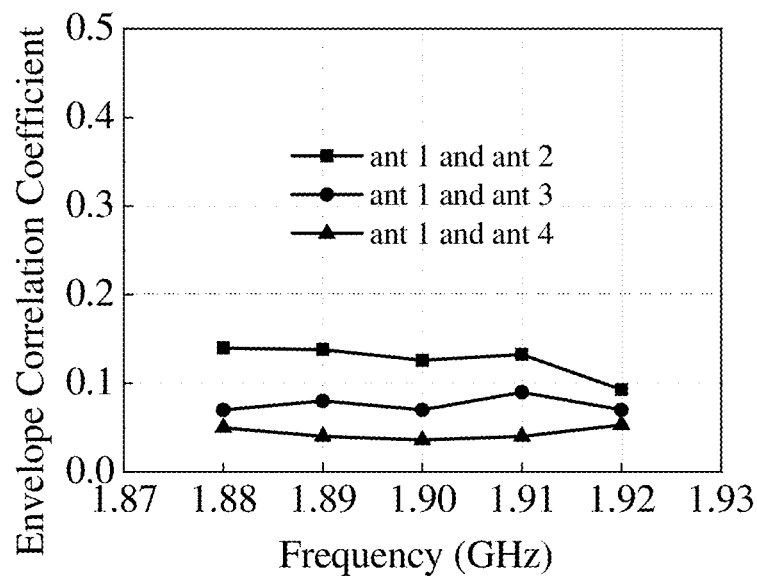
FIGS. 16A and 16B show calculated envelope correlation coefficients (ECC) from radiation patterns for the lower and upper frequency bands.
Figure 16B:
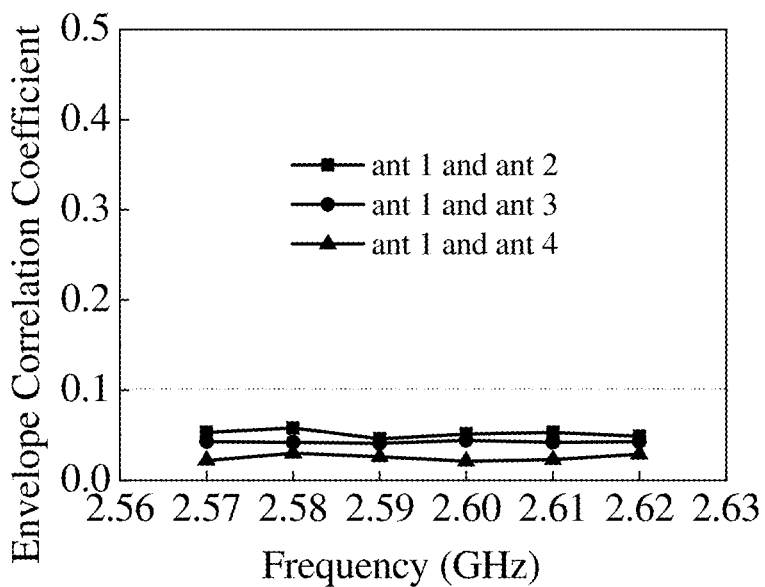

Using the proposed MIMO antenna elements (that is, the low-profile dual-band filtering patch antenna units) and decoupling network, a 4-element MIMO antenna operating at TD LTE B39- and B38-bands for CPE is implemented. The four antenna elements share a single PCB substrate with a thickness of 1.575 mm (0.009$\lambda_o$). The measured S-parameters of the MIMO antenna are shown in FIG. 14. With reference to the figure, the passband with return loss >10 dB covers both the TD-LTE B39-band (1880-1920 MHz) and B38-band (2570-2620 MHz), and the measured port-to-port isolations between two elements are all less than −19.2 dB. FIG. 15A-15D show measured E-plane and H-plane radiation pattern for element 1 of the 4-element LET MIMO system at 1.9 GHz and 2.6 GHz, respectively. When measuring the radiation pattern, Element 1 was excited while the other three ones were terminated to 50Ω loads. Good directional patterns with low cross-polarization and back radiation are observed. Almost the same results are obtained for the other elements due to the symmetric configuration, therefore they are not shown here for brevity. Finally, the measured far-field electric field patterns are used to evaluate the envelope correlation coefficient (ECC). FIGS. 16A and 16B show calculated envelope correlation coefficients (ECC) from radiation patterns for the lower and upper frequency bands. It can be seen that the ECC for TD-LTE B39-band is less than 0.2 while the ECC for B38-band is less than 0.1, satisfying the criterion of acceptable ECC (<0.5) for MIMO operation.

By using the low-profile dual-band filtering patch antenna units, the proposed LET MIMO system outperforms the classical one with four sets of separated antenna and filter pair because no insertion loss is introduced by cascading the filtering and impedance matching circuits. Moreover, compact size and low profile are obtained in this design. Therefore, the LET MIMO system is suitable for wireless CPE applications in LTE.

In the present application, low-profile dual-band filtering patch antenna operating at TD-LTE B39- and B38-bands has been firstly proposed. By using two embedded U-shaped radiating patches and a multi-stub microstrip feed-line, two operating bands and four radiation nulls can been generated and individually controlled, the design is thus very simple and flexible. A prototype has been fabricated and tested. The measured in-band gains of the prototype are 6.7 and 7.3 dBi at the two operating bands, and out-of-band gains are less than −10 dBi, indicating high in-band radiation efficiency and high out-of-band radiation rejection levels. Since no complex filtering and matching networks are involved, the proposed low-profile dual-band filtering patch antenna is very compact and the insertion loss of feeding circuit is desirably low. Based on the proposed low-profile dual-band filtering patch antenna, a 4-element MIMO antenna has been presented. The final design has a very low profile of 0.009$\lambda_o$, low mutual coupling and low ECCs. These attractive features make the MIMO antenna a potential candidate for LTE CPEs.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A low-profile dual-band filtering patch antenna comprising a substrate, a ground on a bottom layer of the substrate, and a first U-shaped patch operating at upper frequency bands, a second U-shaped patch operating at lower frequency bands and a multi-stub microstrip line, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure; wherein the multi-stub microstrip line is arranged on a top layer of the substrate and comprises a main transmission line inserted into an opening of the first U-shaped patch, a first pair of open-ended stubs and a second pair of open-ended stubs loaded at both sides close to openings of the first U-shaped patch and the second U-shaped patch.

2. The low-profile dual-band filtering patch antenna according to claim 1, wherein the first U-shaped patch and the second U-shaped patch are arranged symmetrically relative to a central axis.

3. The low-profile dual-band filtering patch antenna according to claim 1, wherein the main transmission line is loaded along the central axis, the first pair of open-ended stubs and the second pair of open-ended stubs are loaded symmetrically on both sides of the main transmission line.

4. The low-profile dual-band filtering patch antenna according to claim 3, wherein the first pair of open-ended stubs having a shorter length and the second pair of open-ended stubs having a longer length are parallel to each other, the main transmission line crosses the first pair of open-ended stubs and reaches the second pair of open-ended stubs.

5. The low-profile dual-band filtering patch antenna according to claim 3, wherein a length of the first pair of open-ended stubs is shorter than a length of the first U-shaped patch, and a length of the second pair of open-ended stubs is longer than the length of the first U-shaped patch but shorter than a length of the second U-shaped patch.

6. A low-profile dual-band filtering patch antenna comprising a substrate, a ground on a bottom layer of the substrate, and a first U-shaped patch operating at upper frequency bands, a second U-shaped patch operating at lower frequency bands and a multi-stub microstrip line, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure; wherein the second U-shaped patch and the multi-stub microstrip line are arranged symmetrically relative to a central axis; wherein the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch; wherein the main transmission line is loaded along the central axis, the first pair of open-ended stubs and the second pair of open-ended stubs are loaded symmetrically on both sides of the main transmission line, the first pair of open-ended stubs having a shorter length and the second pair of open-ended stubs having a longer length are parallel to each other, the main transmission line crosses the first pair of open-ended stubs and reaches the second pair of open-ended stubs.

7. The low-profile dual-band filtering patch antenna according to claim 6, wherein a length of the first pair of open-ended stubs is shorter than a length of the first U-shaped patch, and a length of the second pair of open-ended stubs is longer than the length of the first U-shaped patch but shorter than a length of the second U-shaped patch, and an input port connecting to the main transmission line.

8. A LET MIMO system, comprising a substrate, a ground on a bottom layer of the substrate, and at least one low-profile dual-band filtering patch antenna unit arranged on the substrate, wherein the low-profile dual-band filtering patch antenna unit comprises a first U-shaped patch operating at upper frequency bands, a second U-shaped patch operating at lower frequency bands and a multi-stub microstrip line on a top layer of the substrate, the first U-shaped patch having a smaller size is embedded in the second U-shaped patch having a larger size; wherein, when operating at the upper frequency bands, the multi-stub microstrip line forms a feeding structure, and when operating at the lower frequency bands, the multi-stub microstrip line and the first U-shaped patch form the feeding structure; the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch.

9. The LET MIMO system according to claim 8, wherein comprising at least two low-profile dual-band filtering patch antenna units arranged at two sides of a substrate central axis of one substrate.

10. The LET MIMO system according to claim 8, wherein comprising at least four low-profile dual-band filtering patch antenna units arranged at four angles of one rectangular substrate.

11. The LET MIMO system according to claim 9, wherein each two low-profile dual-band filtering patch antenna units are arranged parallelly and close to each other, and isolated by a decoupling network.

12. The LET MIMO system according to claim 11, wherein the decoupling network comprising at least three interdigital short-ended lines with a length of about a quarter-wavelength at the lower frequency bands.

13. The LET MIMO system according to claim 8, wherein the first U-shaped patch and the second U-shaped patch are arranged symmetrically relative to a central axis.

14. The LET MIMO system according to claim 8, wherein the main transmission line is loaded along the central axis, the first pair of open-ended stubs and the second pair of open-ended stubs are loaded symmetrically on both sides of the main transmission line.

15. The LET MIMO system according to claim 14, wherein the first pair of open-ended stubs having a shorter length and the second pair of open-ended stubs having a longer length are parallel to each other, the main transmission line crosses the first pair of open-ended stubs and reaches the second pair of open-ended stubs.

16. The LET MIMO system according to claim 14, wherein a length of the first pair of open-ended stubs is shorter than a length of the first U-shaped patch, and a length of the second pair of open-ended stubs is longer than the length of the first U-shaped patch but shorter than a length of the second U-shaped patch.

17. The LET MIMO system according to claim 11, wherein the first U-shaped patch and the second U-shaped patch are arranged symmetrically relative to a central axis; the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch; the main transmission line is loaded along the central axis, the first pair of open-ended stubs and the second pair of open-ended stubs are loaded symmetrically on both sides of the main transmission line; the first pair of open-ended stubs having a shorter length and the second pair of open-ended stubs having a longer length are parallel to each other, the main transmission line crosses the first pair of open-ended stubs and reaches the second pair of open-ended stubs; a length of the first pair of open-ended stubs is shorter than a length of the first U-shaped patch, and a length of the second pair of open-ended stubs is longer than the length of the first U-shaped patch but shorter than a length of the second U-shaped patch.

18. The LET MIMO system according to claim 12, wherein the first U-shaped patch and the second U-shaped patch are arranged symmetrically relative to a central axis; the multi-stub microstrip line comprises a main transmission line inserted into an opening of the first U-shaped patch, a first pair of open-ended stubs and a second pair of open-ended stubs loaded at both sides close to openings of the first U-shaped patch and the second U-shaped patch; the main transmission line is loaded along the central axis, the first pair of open-ended stubs and the second pair of open-ended stubs are loaded symmetrically on both sides of the main transmission line; the first pair of open-ended stubs having a shorter length and the second pair of open-ended stubs having a longer length are parallel to each other, the main transmission line crosses the first pair of open-ended stubs and reaches the second pair of open-ended stubs.

* * * * *